Feb. 4, 1936.  R. NICCOLAI  2,029,939
HYDROSTATIC VALVE, MORE PARTICULARLY FOR SIPHON DISCHARGE APPARATUS
Filed June 22, 1934  4 Sheets-Sheet 1
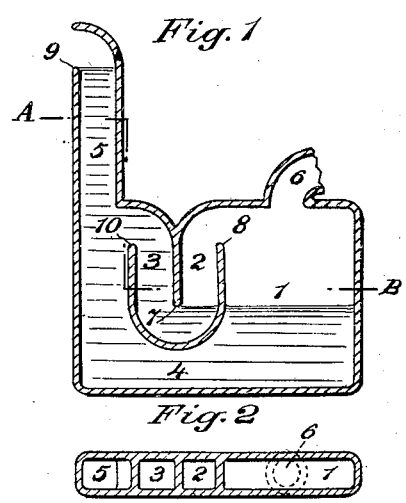
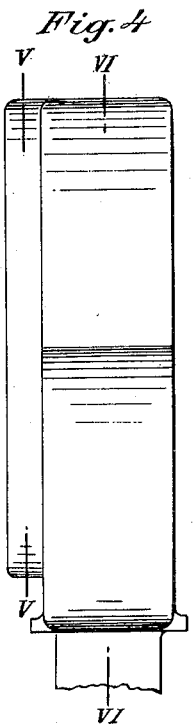
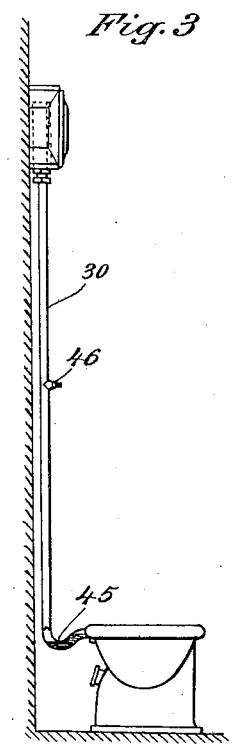
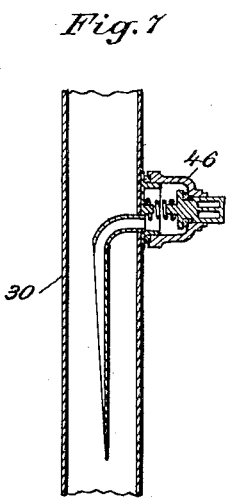
R. Niccolai
INVENTOR
By: Marks & Clerk
Attys.

Feb. 4, 1936.  R. NICCOLAI  2,029,939
HYDROSTATIC VALVE, MORE PARTICULARLY FOR SIPHON DISCHARGE APPARATUS
Filed June 22, 1934  4 Sheets-Sheet 2
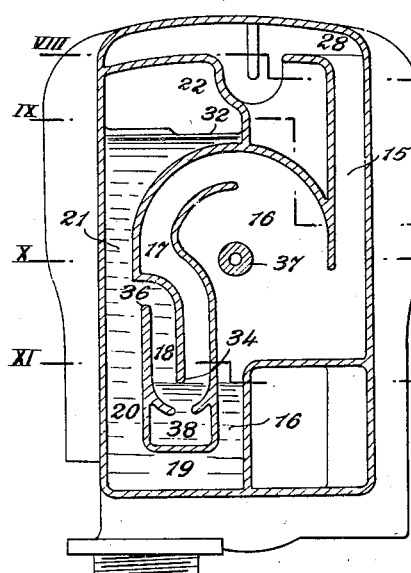
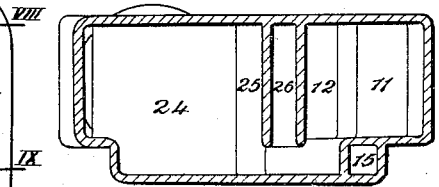
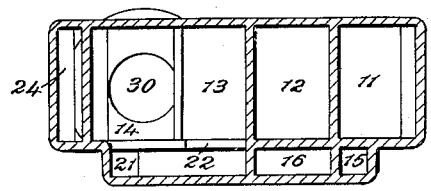
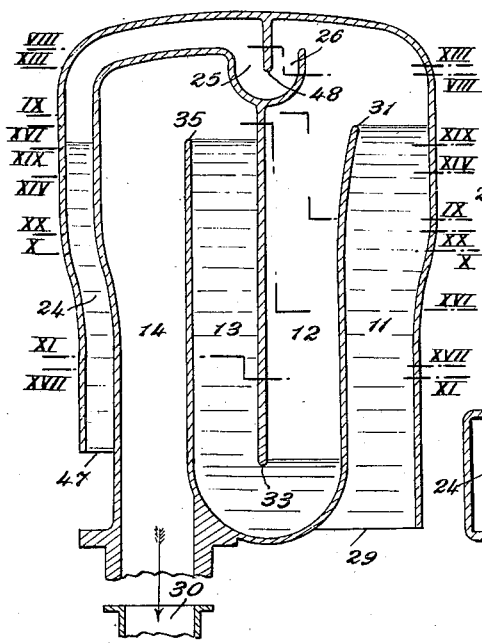
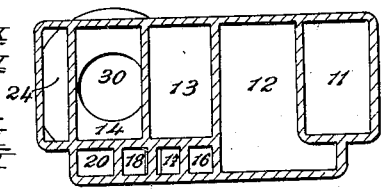
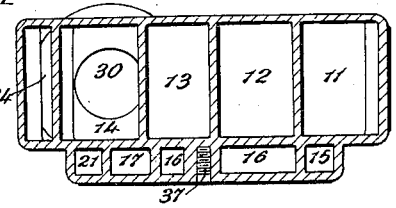

Feb. 4, 1936. R. NICCOLAI 2,029,939
HYDROSTATIC VALVE, MORE PARTICULARLY FOR SIPHON DISCHARGE APPARATUS
Filed June 22, 1934 4 Sheets-Sheet 3
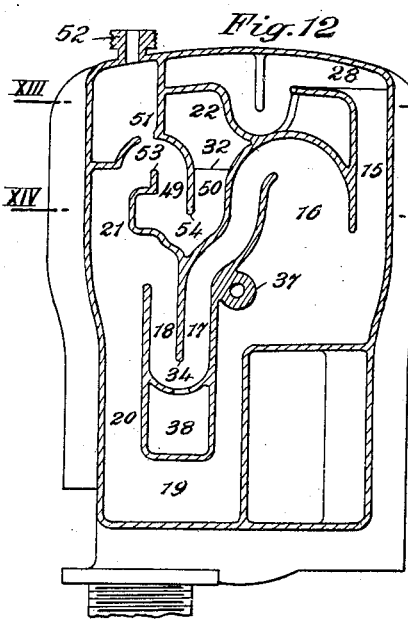
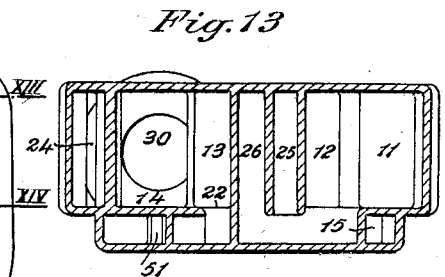
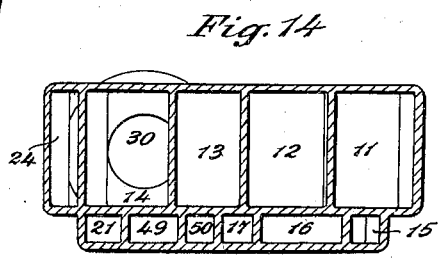
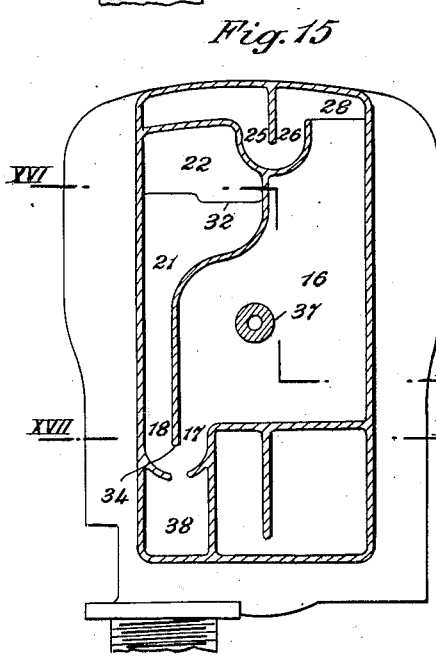
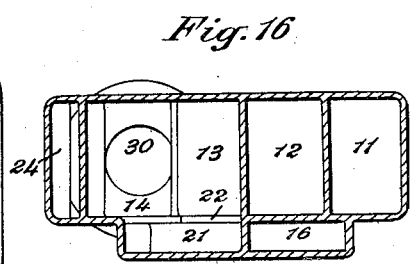
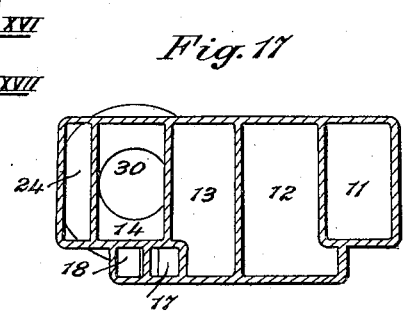
R. Niccolai
INVENTOR
By Marks & Clerk
Attys.

Patented Feb. 4, 1936

2,029,939

UNITED STATES PATENT OFFICE 2,029,939

HYDROSTATIC VALVE, MORE PARTICULARLY FOR SIPHON DISCHARGE APPARATUS

Ruggero Niccolai, Rome, Italy

Application June 22, 1934, Serial No. 731,997
In Italy August 22, 1933

4 Claims. (Cl. 137—106)

The invention relates to a hydrostatic valve for suction discharging devices or siphons of liquid containers, a small hydrostatic difference in equilibrium being employed in order suddenly to open a gas- (or air-) discharging conduit under pressure, so that a free outlet can take place after the pressure has attained a predetermined value, the outlet conduit being therefore maintained open, despite the fact that the gas pressure gradually falls until it disappears.

Apart from a number of advantages to be described hereinafter, one of the principal advantages of the invention is the reliability of the operation of the hydrostatic valve.

In the accompanying drawings:

Figs. 1 and 2 show in vertical and horizontal section, respectively, the hydrostatic valve according to the invention.

Fig. 3 shows a complete diagram of a water closet provided with the discharging device.

Fig. 4 shows a side view of the siphon.

Figs. 5 and 6 are vertical sections along the line V—V and VI—VI in Fig. 4.

Fig. 7 shows the arrangement of the push button for controlling the siphon.

Figs. 8, 9, 10 and 11 are horizontal sections along the lines VIII—VIII, IX—IX, X—X and XI—XI in Figures 5 and 6.

Fig. 12 is a section similar to Fig. 5 but with some modifications.

Figs. 13 and 14 are horizontal sections along the lines XIII—XIII and XIV—XIV in Figures 12 and 6.

Fig. 15 is a section similar to Fig. 5 but with some simplifications.

Figs. 16 and 17 are horizontal sections along the lines XVI—XVI and XVII—XVII in Figs. 15 and 6.

Figure 18:
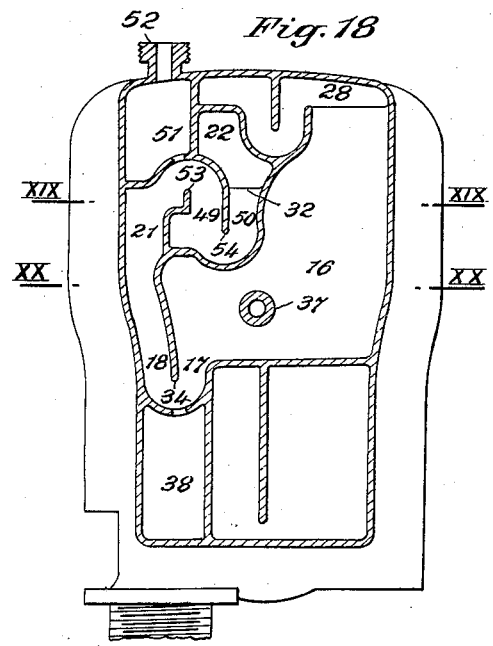
Fig. 18 is a section similar to Fig. 12 but with some simplifications, and finally
Figure 19:
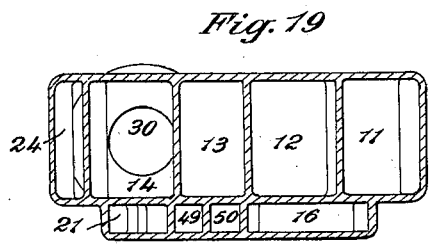
Figs. 19 and 20 are horizontal sections along the lines XIX—XIX and XX—XX in Figures 18 and 6.
Figure 20:
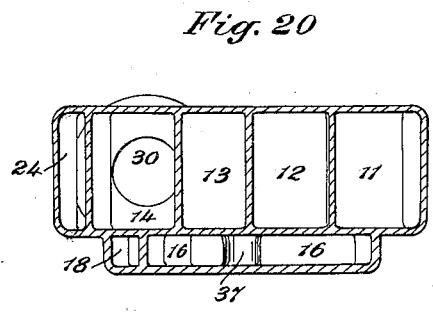

The hydrostatic valve, Figures 1 and 2, comprises substantially the vessel 1 and the pipes 2, 3, 4 and 5. The vessel 1 is connected by the pipe 6 to a container in which air or some other gas is compressed to a predetermined pressure, above which the gas can escape freely. The capacity of the vessel 1 in the parts between the levels 7 and 8 must be at least equal to the sum of the capacity of the pipe 5 (between the levels 9 and 10) and of the pipe 3 (between the levels 7 and 10).

The pipe 5 ascends vertically and is open in its upper part at the level 9, which is so calculated that the difference in level between the points 7 and 9 corresponds to a column of water which exactly balances the maximum pressure which the gas can attain in the container.

To describe the operation of the device, it will be assumed that it is full of water, at least up to the level 10.

In proportion as the gas pressure in the container increases, it acts through the pipe 6 on the water contained in the vessel 1 and in the pipe 2 so that the level of the said water falls, and effects through the pipes 3 and 4 the raising of a column of water in the pipe 5, the said column of water obviously not being able to rise above the point 9.

As the pressure increases, any excess of water in the container 1 and in the pipe 2 slows away over the point 9.

When the gas in the container reaches the predetermined pressure, the water in the container 1 and in the pipe 2 will have fallen to the level 7, and the gas pressure is balanced by the column of water which has been formed in the pipe 5 between the levels 7 and 9.

With continued increasing gas pressure in the container, the balanced column of water which has now attained its maximum level, cannot ascend any higher. Consequently, the condition of equilibrium is disturbed and the gas of the container escapes freely through the pipes 2, 3 and 5, which remain fully open, because the water residue of the pipes 3 and 5, which residue practically cannot pass above the point 9, descends again through the pipe 4 into the vessel 1, which as stated can contain its entire quantity situated between 7 and 8 without allowing any overflow into the pipe 2 over the point 8 or in the pipe 3 over the point 10, if for constructional considerations the point 8 is situated above point 10.

The filling of the device which is necessary in order that, after the escape of the gas, the device shall be again ready in its initial conditions for a new operation may be effected in different ways according to the different intended purposes, as will be described, for example by the following form of construction.

Figures 3 to 11 show the invention as applied to a discharge siphon for lavatory flushing cisterns.

The device is constructed in the form of a double siphon, Fig. 6, comprising the pipes 11, 12, 13 and 14, the cross-sections of which correspond to that of the outlet pipe 30 of the flushing cistern. The pipe 11 dips into the flushing cistern at the level 29, and the pipe 14 communicates with the pipe 30, the length of which does not in any way affect the operation of the device.

On the rear of the double siphon is disposed the aforesaid hydrostatic valve.

It comprises in this case, Fig. 5, the pipe 15, which communicates at the top with the highest part of the first siphon (pipes 11 and 12) through the orifice 26 out of the vessel 16 and the pipes 17, 18, 19, 20 and 21, the latter through the orifice 22 communicating with the pipes 13 and 14 at a higher level than 35, so that the communication with the pipe 14, because during the filling of the flushing cistern, the overflow of the excess of water in the vessel 16 takes place preferably into the pipe 13, in order to prevent it occurring as a loss from the device as would be the case if it took place into the pipe 14 and thus into the pipe 30 and into the vessel.

The capacity of the vessel 16 between the levels 34 and 36 must be at least equal to the total capacity of the pipe between the levels 34 and 36 and of the pipe 21 between the levels 36 and 32.

The vessel 36 attached to the bottom of the pipes 17 and 18 and communicating with them is merely intended to collect any impurities of the water, without diminishing the cross-section of the pipes.

The transverse dimension of all the pipes forming the hydrostatic switch is equal, so that on account of simplicity all these pipes are closed by a detachable plate which, by means of a plug (not shown) in a block 37 connected to the device by casting, is screwed airtight to the said block.

In order to describe the operation of the device it will be assumed that first of all the vessel 16 and the pipes 17, 18 and 20 have been filled with water, at least to the level 36. It will be explained hereinafter how this may be done automatically.

At the commencement of the filling of the cistern, the water rises at the same rate in the cistern and in the pipe 11, the air contained in the pipe 11 being able to escape freely through the pipes 12, 13, 14 and 30. When the water in the pipe 11 has reached the level 31, it flows into the pipe 12 and interrupts the escape of air taking place through the pipes 13, 14 and 30.

Since consequently, as the water rises in the cistern, the water which flows from the pipe 11 into the pipe 12 cannot rise in the latter, because the air contained therein has no escape, it rises on the contrary in the pipe 13 and forms a column of water which balances that which is formed in the cistern above the level 31.

At the same time, the air of the pipe 12 forces the water of the vessel 16 and the pipe 17 down through the orifice 23 and the pipe 15, and produces a balancing column in the pipe 21 which obviously at the top has its limit at the level 32.

The air which is necessary in order to replenish the water in the vessel 16 and in the pipe 17 in the proportion in which it sinks, is supplied by the pipe 12, in which the water consequently rises above the point. This level, by suitable calculation of the cross-section of the pipes, is limited to the level deemed suitable.

The difference in level between the water in the cistern and that in the pipe 11 is balanced through the double siphon by the column which has been formed in the pipe 13 above the level in the pipe 12, and through the hydrostatic valve by the column which has formed in the pipes 18 and 21 above the level in 16 and 17.

The various levels in the device are so calculated that when the water attains its normal level in the cistern, the level of the water in the pipe 17 is for example still 8 millimetres above the point 23 and that in the pipe 13 is still above 15 millimetres below the point 35.

Under these conditions, the device is ready for operation.

It is clear that in order to discharge the cistern, it is merely necessary to diminish the column of water formed in the pipes 18 and 21. It will be described hereinafter how this is effected.

The air pressure, which is no longer balanced by the residual column in 18 and 21, then overcomes the resistance of the said column, and while the water in these pipes descends again through the pipes 20 and 19 into the vessel 16 (which latter, as already stated, can contain it fully without allowing any overflow into the pipe 18 over the point 36), the air of the pipe 12, which air is compressed by the water, which in the pipe 11 tends to rise to the same level as the water in the cistern, and also by the water column in the pipe 13, which column is no longer balanced and therefore tends to fall, flows through the pipe 15, the vessel 16, the pipes 17, 18 and 21 (which have remained fully open) and through the orifice 22 in the upper part of the siphon formed by the pipes 13 and 14, and through the pipes 14 and 30 into the open.

The water flowing from the pipe 11 into the pipe 12 effects the starting of the double siphon, which takes place extremely rapidly, because the air escapes freely through the hydrostatic valve until the water of the pipe 11 flows through the orifice 28 into the pipe 15 and floods the siphon of the hydrostatic valve, which only takes place when all the air has escaped from the pipes 11 and 12.

After starting the double siphon, the vacuum created in the pipe 14 makes itself perceptible through the orifice 22 in the hydrostatic switch also, which in its turn forms an auxiliary outlet siphon, and when, after the cistern has been discharged, both the double siphon and also the hydrostatic valve cease to act, the water contained in the vessel 16 and in the pipe 15 falls again (despite the vacuum in the pipes 30 and 14) ensures a level 36 in the hydrostatic valve, whereby the latter again becomes ready for operation.

The balancing column produced in the pipe 21 of the switch may be diminished in various ways. For normal flushing cisterns, it is possible to employ the following method, for example: At the bottom of the outlet pipe 30 of the cistern, at the connecting point of the pan, a siphon 45 is formed, the height of which may vary, but is advantageously limited to 25 millimetres. It is clear that this siphon, instead of being formed on the lower part of the pipe 30, may also be provided as part of the construction of the pan itself.

After each discharge of the flushing cistern, this siphon always remains full of water.

In that case, at the commencement of the filling of the flushing cistern, the air contained in the pipes 11, 12, 13 and 14 (assuming that the pipes 12, 13 are empty) cannot escape through the outlet pipe 30, but must overcome a resistance which is equal to the column of water, for example of 25 millimetres, which forms in the lower siphon 45. Consequently, the water does not rise at the same rate as in the pipe 11, until a column of water is formed which balances that of the lower siphon.

In the hydrostatic valve, no displacement of water takes place, because the air pressure in the pipe 11, which pressure is effective in the switch through the orifice 28 and the pipe 15, is balanced by the air-pressure (caused by the column of water in the lower siphon 45) in the pipe 14, which air-pressure acts in the switch through the orifice 22.

If, however, in the pipes 12 and 13 during the filling of the flushing cistern, there is no appreciable quantity of water present (which is the case after each discharge of the flushing cistern), the air in the pipes 11 and 12, not being able to escape, causes a column of water to rise in the pipe 13 and another column of water (for example of 25 millimetres) to rise in the lower siphon 45.

In this case, the water in the flushing cistern gradually rises to the level of the pipe 11 until a column of water is formed which is balanced by the sum of the water columns in the pipe 13 and in the lower siphon 45.

In the hydrostatic valve, therefore it is clear that a column of water of the same height as that in the pipe 13 rises in the pipe 21.

Furthermore, there is no change in the operation of the apparatus which while the flushing cistern is being filled, passes through the stages already described. However, when the water in the flushing cistern has reached its normal level, the column of water contained therein above point 31 is obviously 25 millimetres higher than the column of water formed in the pipe 13, and also than that in the pipes 18 and 21 of the hydrostatic valve.

In other words, the balancing column of water in the hydrostatic valve is given by the column of water in the pipes 18 and 21 increased, for example of 25 millimetres, which originates from the air pressure created in the pipes 14 and 30 by the column of water in the lower siphon 45.

On the outlet pipe 30 is a push button 46, Figures 3 and 7, through the operation of which the compressed air in the pipe 30 can escape freely.

If the flushing cistern is to be discharged, the button 46 is pressed. The balancing column thereby falls by 25 millimetres, due to the escape of the air from the outlet 30 and the pipe 14. Consequently, the hydrostatic valve "snaps" and the double siphon is primed.

It may be, however, that when the water in the flushing cistern has reached the level 29, and water enters through the pipe 11 into the double siphon, its switching off begins, and since at this moment the float valve for feeding the flushing cistern is fully open, then due to the reduced suction effect of the double siphon, the level of the water in the flushing cistern might tend to rise above the level 29 and thus flood the pipe 11 before sufficient air for fully switching off the double siphon has penetrated therein.

This would disturb the equilibrium in the whole system, and most sensitively in the case under discussion, since the descent of the column of water in the pipe 30 is effected by switching off the double siphon would create a vacuum in the pipe 14, which vacuum cannot be eliminated because the lower siphon 45 does not allow any communication of the pipe 14 with the outer air.

In order to obviate this possible disadvantage, the pipe system 24, 25 and 26 is provided.

At the bottom, the pipe 24 is connected to the flushing cistern at the point 47 which is situated somewhat higher than the point 29 in the pipe 11. The pipe 26 communicates at the top with the highest part of pipes 11 and 12.

The pipes 24, 25 and 26 form a unit which is absolutely like the hydrostatic valve, and in which the pipe 15 and the vessel 16 are replaced by the flushing cistern and the pipe 24, and the pipe 21 is replaced by the double siphon.

In the filling stage of the flushing cistern, the water rises in the pipe 24 and the pipe 11, and attains the same level 31.

When the double siphon starts, the vacuum of the pipe 11 is also effective in the pipe 24, and the pipe system 24, 25 and 26 acts together like an auxiliary pipe of the double siphon.

When the water in the flushing cistern has risen to the level 47, the feed valve being full open, the said water afterwards tends to fall (due to the double siphon having started) without however attaining the point 29 suitably disposed relatively to the reference datum 47.

At the same time, air is drawn through the pipe 24, the water contained therein falls back into the flushing cistern, and the level of the water in the pipe 25 falls and, on attaining the point 48, allows this auxiliary valve to start. The pipes 24, 25 and 26 then effect a free air inlet in the double siphon and its complete switching off.

This switching off takes place so rapidly that the level of the water in the flushing cistern (the said level tending to rise during the switching off) attains the point 47 before switching off is completed. In addition, however, the noise which in ordinary flushing cisterns is unavoidable on account of the fact that, on switching off, air flows into the double siphon out of the pipe 11 through a not inconsiderable quantity of water into the double siphon, is almost entirely prevented.

It will now be examined whether the invention actually eliminates the disadvantages of the ordinary discharging devices.

1. When the water in the flushing cistern rises above the normal level, according to the invention, it cannot, as in similar devices, flow over into the outlet pipe, since the higher column of water which would form in the flushing cistern above the point 31 would produce a higher air pressure in the pipe 12, that is to say, a rise in the pipe 13 and a fall in the pipes 17 and 19. Before the water can flow over 35, the air pressure in the pipe 12 overcomes the resistance produced by the column in the pipes 18 and 21. The valve, on starting, allows the air a free escape and the device operates automatically.

2. When, during the filling of the cistern, the button is held depressed, no pressure, for example of 25 millimetres, can occur in the outlet 30, and hence the balancing column would be limited to that formed in the pipes 18 and 21.

In this case, the device discharged itself systematically as soon as the water in the cistern has reached a level of for example 25 millimetres below the normal. However, the disadvantages of an overflow at the outlet, such as occurs with other devices of this kind and can only be prevented by discharging the cistern in some way or other, is obviated.

3. When the push button is not depressed for a sufficiently long time, the water tends to fall in the pipes 16 and 17, due to the drop in pressure in the pipe 30, and the higher column forming above the level in the pipes 18 and 21 has a balancing effect upon the lowered pressure in the pipe 30, without equilibrium being disturbed. The device does not operate, but remains ready for operation until the button is again depressed, without there being any danger of an overflow of water in the outlet pipe 30 as in ordinary devices.

4. The noise which is quite unavoidable in ordinary devices is almost entirely eliminated according to the invention by means of a valve of the kind described.

The first filling of the valve after the assembly of the device may be effected by a first starting of the double siphon, for example by filling the flushing cistern as usual, which if desired can be assisted by adding water to the ordinary quantity of water supplied by the feed valve, so that the level of the water in the cistern rises very rapidly.

If the flushing cistern is disposed at a sufficient height above the pan (Figure 3), the unit forming the hydrostatic valve may simply comprise the pipes 17, 18 and 21, and the vessel 16 (Figure 15).

In this case, at the moment of starting the valve, a portion of the water forming the column in the pipes 18 and 21 falls into the pipes 17 and 18, and thereby considerably excludes the escape of air from the pipe 12, in which the pressure is consequently diminished but is not eliminated.

However, at the level of the outlet pipe 30, this simple disturbance of equilibrium is sufficient to bring about, even though not immediately, the starting of the double siphon.

The push botton may act resiliently or in some other way.

The following is a control for actuating the device whereby the lower siphon 45 is eliminated (Figures 12, 13 and 14).

The pipe 21 of the hydrostatic valve is bent into the form of an inverted siphon comprising the arms 49 and 50, of which the arm 50 communicates by way of orifice 22 with the pipes 13 and 14 at a point which is situated above the level 35. The upper part of the pipes 49 and 21 communicates through the orifice 51 with the nipple 52 of the push button.

During the filling of the cistern, and as the balancing column gradually rises in the pipe 21, the air can escape freely out of the latter through the pipes 49 and 50, the orifice 22 and the pipes 14 and 30.

When the water in the pipe 21 stands at the level 53, it overflows into the pipe 49 and at the level 54 cuts off the escape of air from the pipe 49 through the pipe 50, the orifice 22 and the pipes 14 and 30.

As the level of the water in the cistern rises, and hence as the pressure on the water in the pipes 16 and 17 increases, the latter flows over the level 53 into the pipe 49, since it cannot ascend further in the pipe 49 because the air cannot escape out of the said pipe, and rises in the pipe 50 up to the point 32.

When the water in the cistern has reached its normal level, the column formed therein above the point 31 is balanced through the valve by the column which has risen in the pipe 21 to the point 53 in combination with the column formed in the pipe 50 between the points 54 and 32.

In this way, the column of water formed in the pipe 50 replaces the lower siphon, but with the difference that whereas for balancing the column formed in the cistern above the point 31 during filling, the lower siphon 45 forms an extension both for the resistance column in the pipe 13 and for the resistance column of the pipes 18 and 21, the column forming in the pipe 50 during the filling of the cistern forms an extension only for the column of the pipes 18 and 21.

In this case, the device must be so constructed that a column can be formed in the pipe 13, which column without the assistance of the lower siphon, balances the column formed in the cistern above the point 31, while in the valve this column is balanced by the sum of the columns 18, 21 and 50. There is no other change in the operation of the device.

When by operating a push-button (which in this case obviously should not be provided on the outlet pipe of the cistern, but externally thereof) the compressed air is allowed to escape from the pipe 49 through the orifice 51, the continuity of liquid in the pipes 21, 49 and 50 being thereby restored, the balancing column in the switch no longer corresponds to the sum of the columns in the pipes 21 and 50, but of the column between the point 32 and the level in the pipes 16 and 17, which column is obviously shorter than the first column.

In this way, equilibrium is disturbed, the valve starts and effects the starting of the double siphon as explained hereinbefore.

On the starting of the double siphon, the column of water in the pipe 21 falls again, thus effecting the almost complete discharge of the pipes 49 and 50 and hence the admission of air.

Since, as described in the foregoing, the device may operate automatically when the water in the flushing cistern rises above the lever 31 and thus overcomes the resistance column of the valve, it is clear that the automatic discharge always occurs exactly at a very definite invariable level of the water in the flushing cistern.

If the elements serving for the reduction of the resistance column are omitted, the device can therefore be employed for discharge at regular intervals, the time between two discharges being then regulated by regulating the supply of water to the cistern so that a pre-determined desired interval of time is necessary for the water to attain the level for automatic starting.

Of course, by suitable constructional modifications within the scope of the invention, the latter may also be rendered suitable for purposes other than that described hereinbefore by way of example.

Having now particularly described and ascertained the nature of my said invention and in what manner the same is to be performed I declare that what I claim is:

1. A hydrostatic valve device characterized by two parallelly disposed inverted siphons, one of which descends to a lower point than the other and is provided with a large chamber, in which the liquid with its free surface can make a vertical stroke which corresponds to the total stroke of the arm of the other siphon, the said arm being connected to the chamber, means for supplying gas to the said chamber and to the said arm under variable pressure, and the other two arms of both siphons being connected and carried upwardly into a hydraulic loading circuit provided with an overflow, the capacity of the chamber corresponding to the above-mentioned stroke being sufficient to contain the quantity of liquid which flows back out of the above-mentioned discharge conduit when the gas under varying pressure forces the liquid out of the siphon so that it falls to a minimum level, which is higher than that of the other siphon.

2. A hydrostatic valve as claimed in claim 1 for automatically discharging flushing cisterns, characterized in that the equilibrium column of the valve is not diminished for discharging, but the equilibrium is disturbed when the water in the cistern rises above such a value that the resistance of the equilibrium column in the valve is overcome.

3. A hydrostatic valve as claimed in claim 1 applied to a device for the rapid and noiseless starting of the double outlet siphon of the flushing cistern, characterized in that, for starting the air is not drawn through the first ascending arm of the double siphon but is introduced completely through the valve upon the latter starting, thereby ensuring rapid and noiseless switching off.

4. A hydrostatic valve as claimed in claim 1, with a compressed gas supply conduit, a hydraulic chamber into which said conduit opens, a liquid conduit from said chamber and a second liquid conduit in communication with said first liquid conduit and provided with overflow at its top for the loading column of liquid, characterized in that parallel with the above-mentioned parts between the gas conduit and the second liquid conduit is inserted a U-shaped tube from which the liquid is gradually displaced by the continuously increasing pressure of the gas coming from the gas conduit, this taking place at the same time also in said chamber, the liquid being forced rapidly into the second liquid conduit when the said pressure exceeds a certain value, and the displaced liquid not flowing from the second liquid conduit back into the U-tube but falling back through the first liquid conduit into the said chamber, since the second liquid conduit is offset horizontally relatively to the U-tube, said chamber being sufficiently capacious to contain the water flowing back out of the second liquid conduit, without flooding the said U-tube.

RUGGERO NICCOLAI.